July 26, 1966  C. M. ALLABEN, JR  3,262,527
FLUID SHEAR COUPLING
Filed Feb. 3, 1964
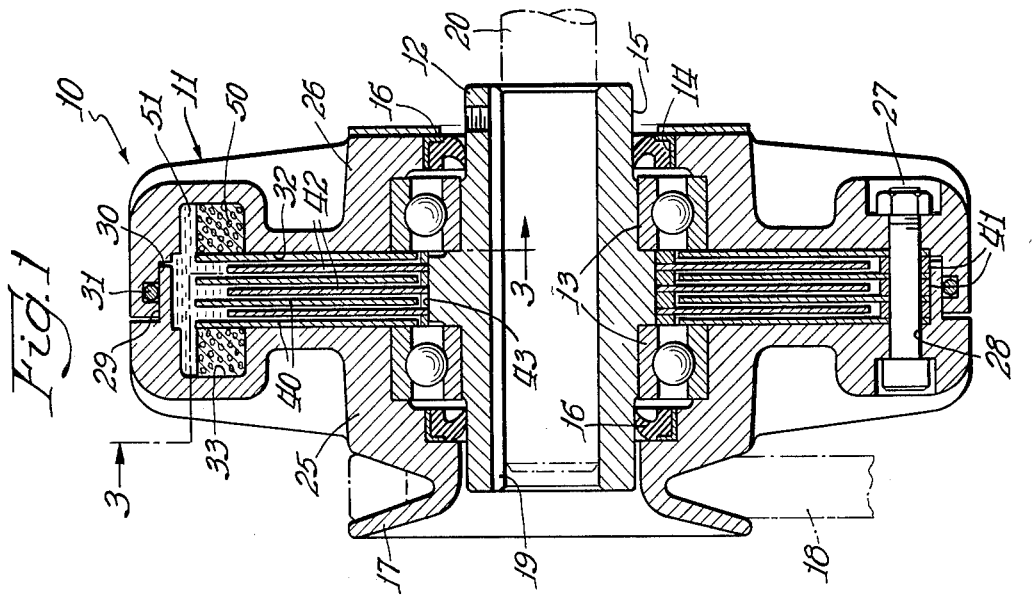
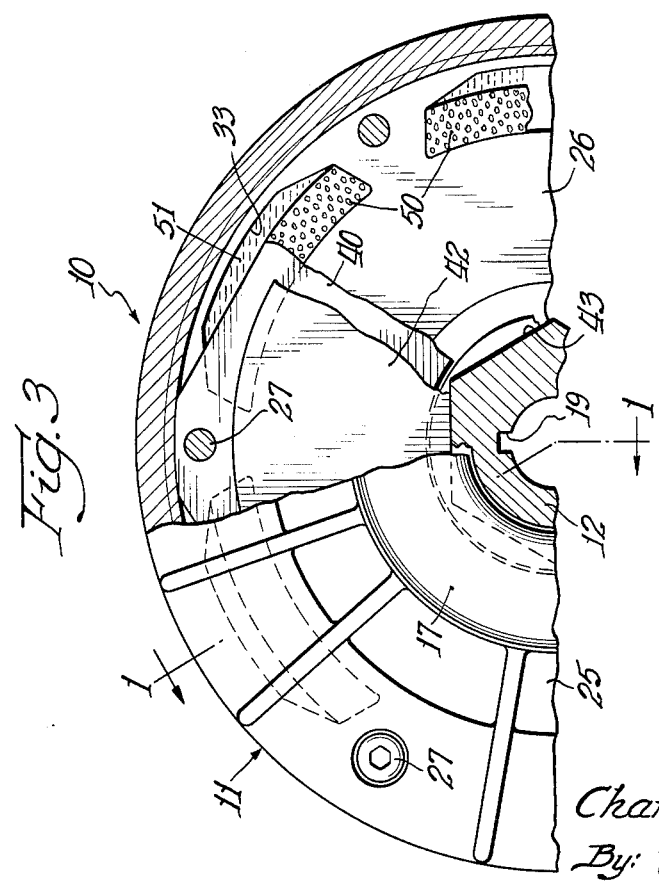
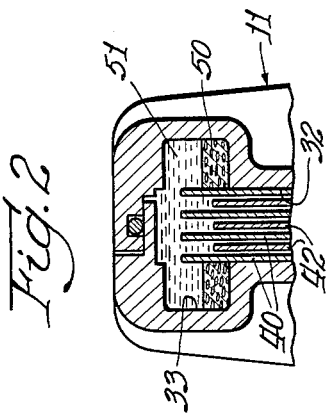
Inventor:
Charles M. Allaben, Jr.
By: Evan D. Roberts Atty 3,262,527
FLUID SHEAR COUPLING
Charles M. Allaben, Jr., Ithaca, N.Y., assignor to Morse Chain Company, Ithaca, N.Y., a corporation of New York
Filed Feb. 3, 1964, Ser. No. 342,117
5 Claims. (Cl. 192—58)

This invention relates to a fluid shear coupling and more particularly to an improved fluid shear coupling provided with automatically controlled speed and disengagement of the driven member from the drive member thereof.

Known types of fluid shear couplings fail to provide an efficient, reliable, economical and compact structure for accurately disengaging and otherwise controlling the speed of the driven member thereof. Although various attempts have been made to provide structure for controlling the speed and disengagement of impeller type hydraulic couplings, all such attempts are naturally limited to hydraulic couplings relying on kinetic impeller force rather than fluid shear force which forms the basis of the type of coupling over which the present invention is an improvement. Moreover, even these attempts at controlling a hydraulic impeller type coupling have resulted in a structure which is unduly large in diameter, expensive, difficult to manufacture and maintain, excessively complicated, inaccurate, and unreliable. These attempts are generally confined to the use of compressive parts which are subjected to uneven stresses when compressed or expanded during operation of the unit and which are not readily adaptable to variable speed fluid shear conditions. It is, therefore, highly desirable to provide an improved fluid shear coupling having means for accurately controlling the speed and disengagement of the driven element thereof and which is efficient; responsibly effective; of minimum size and complexity; and relatively simple and economical to manufacture, use and maintain.

The present invention contemplates an improved fluid shear coupling wherein drive and driven members form a shear cavity; each member is provided with drive shear plates interpositioned with the driven shear plates of the other member and are poistioned in the shear cavity; fluid is contained in the shear cavity adjacent the shear plates for providing a fluid shear coupling therebetween; and a series of resilient sealed cellular members having one or more cells and respectively positioned in chambers in communication with the shear chamber and the fluid.

It is an object of this invention to provide an improved fluid shear coupling having a structure that provides the coupling with an automatically controllable speed and disengagement of the driven member thereof and which is relatively simple and economical to manufacture, use and sell.

Another object of this invention is to provide an improved fluid shear coupling having a minimum diameter and generally compact structure.

A further object of this invention is to provide an improved fluid shear coupling having resilient sealed cellular element with gas filled cells and that are positioned so as to oppose the filling of the chambers or reservoirs of the coupling that would otherwise result from the centrifugal force acting on the fluid so that when the speed of the driving member is reduced, the resilient cellular member tends to urge the fluid from the reservoir chamber and thereby increase the amount of fluid between the drive and driven plates of the coupling.

A still further object of this invention is to provide an improved fluid sheared coupling having a resilient cellular means having gas filled closed or sealed cells to increase the resilent force thereof in opposition to the force of the rotating fluid when the temperature within the coupling increases, expanding the enclosed gas, and thereby tend to prevent the fluid from escaping from between the drive and driven plates of a coupling or to urge fluid therebetween to maintain or increase the shear area between the plates at a time during the operation of the coupling when the viscosity and the resulting force transmission character of the fluid is otherwise decreasing as a result of the increase in temperature. The resilient means thereby provides a temperature compensating as well as a speed responsive result.

Other objects, advantages and variations of the invention will become apparent to anyone skilled in the art upon consideration of the following detailed description in conjunction with the accompanying drawings wherein:

FIG. 1 is a cross-sectional axial view of a coupling constructed in accordance with the teachings of this invention taken along line 1—1 of FIG. 3 showing the relative position of the various elements thereof;

FIG. 2 is a partial cross-sectional axial view of a coupling constructed in accordance with the teachings of this invention showing the resilient elements collapsed within the reservoir chambers; and FIG. 3 is a partial end view of the coupling taken substantially along line 3—3 of FIG. 1 and broken away to illustrate the various parts of the coupling.

Referring to the figures, there is illustrated a fluid shear coupling generally designated by the numeral 10 and constructed in accordance with the general teachings of this invention. The coupling 10 includes, among other things, a drive member 11 and a driven member 12. The drive member 11 is rotatably mounted on bearings 13 on the driven member 12. The bearings 13 and a space between surfaces 14 and 15 of the drive and driven members 11 and 12 are closed by seals 16 (FIG. 1) inserted in the drive member 11. The drive member 11 is provided with a pulley 17 adapted to receive power from a belt 18 and the driven member 12 is provided with a keyed passage 19 adapted to secure the driven member 12 to a shaft 20 to be driven by the coupling.

The shaft 20, by way of example of an application of the invention, may be drivingly connected to the cooling fan used in a water cooled engine of a vehicle (not shown) wherein the fan is ineffective for cooling and is detrimental at high road speeds and thereby unnecessarily consumes power at such high speeds. The present invention provides an automatically controlled speed and possible disconnection of a driven member and shaft so that when used in the environment mentioned above the cooling fan driven by the shaft would be automatically slowed down at high speeds where vehicle road speed provides ample air circulation, and disconnected at a predetermined appropriately high speed so as to completely remove any effect it may have at high speeds.

The drive member 11 includes a first half 25 provided with the pulley 17 and a second half 26 secured to the first half by a series of bolt and nut units or similar connectors 27 inserted in radially positioned aligned passages 28 in the first and second halves. It should be noted that the first and second halves 25 and 26 are joined along the respective mating surfaces 29 and 30 thereof and sealed by an annular seal 31. The drive member 11, as thus assembled defines an annular shear chamber cavity 32 and the remaining cavity formed by the halves 25 and 26 and a series of angularly spaced reservoir chambers 33 axially recessed in the respective halves and in open communication with the shear chamber 32 constitute a reservoir. It should be noted that the assembly bolts 27 are radially positioned between the reservoir chambers 33 and are located radially inwardly of the outer radial extremity of the reservoir chambers.

Inasmuch as the assembly bolts of presently known couplings are, of necessity, positioned radially outward from all annular mechanisms to avoid interruption thereof, it should be noted that the present invention facilitates an inward positioning of the assembly bolt, provides a coupling of lesser diameter, and generally contributes to the compactness of the coupling.

Drive shear plates 40 are provided within the shear chamber 32 and are secured to the drive member 11 in axially spaced relation determined by spacers 41 and secured by the bolts 27 which extend through the shear plates 40 and the spacers 41. Driven shear plates 42 are similarly positioned on the driven member 12 in spaced interposed relation to the drive shear plates 40 and are secured and spaced on the driven member by a spline 43 or other equivalent structure.

Resilient gas filled closed cellular members 50 are respectively provided in complementary position in the reservoir chambers 33. A shear coupling fluid 51 (FIGS. 1 and 2) of a predetermined viscosity, for example, a silicone fluid of 1000 centistokes viscosity rating is provided in the shear chamber 32 and the portion of the communicating reservoir chambers 33 not occupied by the resilient members 50. When the drive member 11 is rotated, the molecular structure of shear fluid 51 will provide a fluid shear connection between the interposition drive and driven shear plates 40 and 42 with an efficiency dependent, among other things, upon the viscosity of the shear fluid utilized and thereby provide a fluid shear coupling connection between the drive and the driven members 11 and 12.

In the operation of the invention during the time when the drive member is accelerated from zero to some predetermined maximum speed, the drive member 11 will first cause the driven member 12 to rotate due to the fluid shear connection between the drive and driven shear plates 40 and 42 as pointed out above. As the drive member increases its rotational speed, the fluid 51 will be subjected to continuously increasing effects of centrifugal force with the result that the fluid will be subjected to greater pressure in the outer radial portion of the shear chamber 32 and the communicating portion of the reservoir chambers 33 unoccupied by the resilient cellular member 50.

The resilient cellular members 50 will gradually yield and gradually collapse in response to the increasing hydraulic pressure thereon during increased rotational speed of the coupling and thereby allow an increased quantity of fluid 51 to enter the reservoir chambers 33 and thereby remove an equal amount of fluid 51 from shear connecting engagement between the drive and driven shear plates 40 and 42. The driving effect of the drive plates 40 will thereby be lessened in accordance with the amount of fluid removed therefrom.

Thus, by utilizing a fluid 51 having a predetermined viscosity and weight in conjunction with cellular members 50 having a predetermined resiliency, the driven member 12 may thereby be caused to hold an output speed within a small, limited range while input speed varies over a larger range. As a result, a variable shear coupling connection is provided by a continuous tendency to balance the hydraulic pressure of the fluid 51 and the opposing force exerted by the resilient cellular members. Similarly, it can be seen that upon a predetermined speed of the drive member 11 of a given coupling, the cellular members 50 will be collapsed to an extent whereby the shear coupling fluid 51 will be completely evacuated from adjacent the shear plates 40 and 42 and thus result in a complete disconnection of the driven member 12.

It is understood that the foregoing description is merely illustrative of the preferred embodiment of my invention, and that the scope of this invention, therefore, is not to be limited thereto, but is to be determined by the appended claims.

What is claimed is:

1. A fluid shear coupling comprising a drive member having a shear chamber formed therein, a drive shear plate secured to said drive member within the shear cavity, a driven member rotatably secured to said drive member, a driven shear plate secured to said driven member and positioned adjacent said drive plate in spaced relation thereto within the shear cavity, said drive member having angularly spaced reservoir chambers formed therein in communication with the shear cavity, resilient cell members positioned in the reservoir chambers of said drive member, and a fluid in the shear chamber in contact with the resilient members and said shear plates for providing a fluid shear connection between said drive and said driven plates.

2. A fluid shear coupling comprising a drive member having a shear chamber formed therein, a drive shear plate secured to said drive member within the shear cavity, a driven member rotatably secured to said drive member, a driven shear plate secured to said driven member and positioned adjacent said drive plate in spaced relation thereto, said drive member having angularly spaced reservoir chambers formed therein in communication with the shear cavity, resilient sealed cellular members positioned in the reservoir chambers of said driven member, and a fluid in the shear chamber in contact with the resilient members and said shear plates for providing a fluid shear connection between said drive and said driven plates.

3. A fluid shear coupling comprising a drive member having a radially extending shear chamber formed therein, drive shear plates secured to said drive member in spaced relation and extending radially within the shear cavity, a driven member rotatably mounted in said drive member, driven shear plates secured to said driven member and respectively positioned between said drive plates in spaced relation thereto, said drive member having a series of angularly spaced reservoir chambers formed therein in communication with the shear cavity in axially spaced pairs positioned adjacent the outer extremities of said drive plates, resilient sealed cellular members positioned in the reservoir chambers of said drive member, and a fluid in the shear chamber in contact with the resilient members in said series of chambers and said shear plates for providing a fluid shear connection between said drive and said driven plates.

4. A fluid shear coupling comprising a drive member having a radially extending shear chamber formed therein, drive shear plates secured to said drive member in spaced apart relation and extending radially inward within the shear cavity, a driven member rotatably mounted in said drive member, driven shear plates secured to said driven member extending radially outward and respectively positioned between said drive plates in spaced relation thereto, said drive member having a series of angularly spaced reservoir chambers former therein in communication with the shear cavity in axially spaced pairs positioned axially adjacent the outer extremity portion of said drive plates, resilient sealed cellular members positioned in the reservoir chambers of said drive member, and a fluid in the shear chamber in contact with the resilient members in said series of chambers and said shear plates for providing a fluid shear connection between said drive and said driven plates.

5. A fluid shear coupling comprising a driven member, a drive member rotatably mounted on said driven member and having a sealed shear chamber formed therein, one or more driven shear plates secured to said driven member in spaced apart relation and extending radially outward within the shear cavity, one or more drive shear plates secured to said drive member in spaced apart relation extending radially inward within the shear cavity and respectively positioned adjacent said driven shear plates, said drive member having a series of angularly spaced reservoir chambers formed therein in communication with the shear cavity in axially spaced pairs positioned axially adjacent the outer extremity portion of the shear cavity of said drive member, resilient sealed cellular members positioned in the reservoir chambers of said drive member, and a fluid in the shear chamber in contact with the resilient members in said series of chambers and said shear plates for providing a fluid shear connection between said drive and said driven plates.

References Cited by the Examiner

UNITED STATES PATENTS

| | | | |
|---|---|---|---|
| 2,613,779 | 10/1952 | Milford | 192—58 |
| 2,738,048 | 3/1956 | Douglas | 192—58 X |
| 2,863,543 | 12/1958 | Kelsey | 192—58 |
| 3,059,745 | 10/1962 | Tauschek | 192—58 |

DAVID J. WILLIAMOWSKY, *Primary Examiner.*

DON A WAITE, *Examiner.*

A. T. McKEON, *Assistant Examiner.*